United States Patent [19]

Yamamoto et al.

[11] Patent Number: 4,768,473
[45] Date of Patent: Sep. 6, 1988

[54] EXHAUST TIMING CONTROL APPARATUS

[75] Inventors: Hitoshi Yamamoto; Kouji Okazaki; Kanau Iwashita, all of Saitama, Japan

[73] Assignee: Honda Giken Kogyo Kabushiki Kaisha, Tokyo, Japan

[21] Appl. No.: 52,131

[22] Filed: May 18, 1987

Related U.S. Application Data

[63] Continuation of Ser. No. 888,772, Jul. 22, 1986, abandoned.

[30] Foreign Application Priority Data

Jul. 22, 1985 [JP] Japan .................................. 60-161477
Aug. 7, 1985 [JP] Japan ............................ 60-121026[U]
Feb. 14, 1986 [JP] Japan .................................. 61-30348

[51] Int. Cl.4 .............................................. F02B 75/02
[52] U.S. Cl. .................................. 123/65 PE; 123/323
[58] Field of Search .............. 123/65 PE, 65 P, 65 V, 123/323, 65 R

[56] References Cited

U.S. PATENT DOCUMENTS

| | | | |
|---|---|---|---|
| 4,121,552 | 10/1978 | Mithou et al. | 123/65 PE |
| 4,202,297 | 5/1980 | Oku | 123/65 PE |
| 4,333,431 | 6/1982 | Iio | 123/323 |
| 4,341,188 | 7/1982 | Nerstrom | 123/324 |
| 4,364,346 | 12/1982 | Shiohara | 123/65 PE |
| 4,388,894 | 6/1983 | Tanaka | 123/65 PE |
| 4,391,234 | 7/1983 | Holzleitner | 123/65 V |
| 4,399,788 | 8/1983 | Bostelmann | 123/65 PE |
| 4,494,506 | 1/1985 | Hayama | 123/348 |
| 4,516,540 | 5/1985 | Nerstrom | 123/65 PE |
| 4,541,371 | 9/1985 | Kageyama | 123/65 PE |
| 4,621,596 | 11/1986 | Uchinishi | 123/65 PE |
| 4,622,928 | 11/1986 | Uchinishi | 123/65 PE |
| 4,651,684 | 3/1987 | Masuda | 123/90.16 |
| 4,672,924 | 6/1987 | Hiasa et al. | 123/65 PE |
| 4,672,925 | 6/1987 | Miyata et al. | 123/65 PE |

FOREIGN PATENT DOCUMENTS

| | | |
|---|---|---|
| 3232786A1 | 4/1984 | Fed. Rep. of Germany . |
| 47-36047 | 9/1972 | Japan . |
| 51-21038 | 2/1976 | Japan . |
| 51-39112 | 3/1976 | Japan . |
| 51-042497 | 4/1976 | Japan . |
| 51-74623 | 6/1976 | Japan . |
| 51-147813 | 11/1976 | Japan . |
| 52-18333 | 4/1977 | Japan . |
| 52-132916 | 10/1977 | Japan . |
| 54-158514 | 12/1979 | Japan . |
| 55-160107 | 12/1980 | Japan . |
| 56-27014 | 3/1981 | Japan . |
| 56-47609 | 4/1981 | Japan . |
| 57-62917 | 4/1982 | Japan . |
| 57-105511 | 7/1982 | Japan . |
| 58-7059 | 2/1983 | Japan . |
| 58-7060 | 2/1983 | Japan . |
| 58-36818 | 8/1983 | Japan . |
| 59-7008 | 2/1984 | Japan . |
| 59-105928 | 6/1984 | Japan . |

Primary Examiner—Charles J. Myhre
Assistant Examiner—David A. Okonsky
Attorney, Agent, or Firm—Lyon & Lyon

[57] ABSTRACT

An exhaust apparatus for controlling the timing of exhaust operation in two-cycle engines including a pivotally mounted plate positioned in a recess in the upper surface of an exhaust passage. The plate includes a shaft bearing portion above the pivot axis of substantial strength. A plate extending from that bearing portion is reduced in thickness with a upwardly extending ridge at the outer end thereof to define a control surface and sealing mechanism for the plate. The cooperation between the exhaust port and the end of the valve body may be arranged for maximum sealing and maximum wall thickness of the surrounding port.

14 Claims, 17 Drawing Sheets

EXHAUST TIMING CONTROL APPARATUS

This application is a continuation, of application Ser. No. 888,772, filed 7-22-86 and now abandoned.

BACKGROUND OF THE INVENTION

The field of the present invention is timing mechanisms for the exhaust ports of two-cycle engines.

Two-cycle engines typically employ the upper edge of a piston as the means for timing the opening and closing of the exhaust ports. In such engines, the exhaust passage may be tuned such that a reflected wave of pressure initiated by the opening of the exhaust ports can force unburned air fuel mixture, trailing the exhaust gases through the exhaust passage, back into the cylinder just prior to closure of the exhaust porting. This tuning of the exhaust is specifically effective at a limited range of engines speed. Often power can drop off remarkably when the engine speed does not fall within the tuned range.

To broaden the effective power range for two-cycle engines, exhaust timing control devices have been employed which provide an apparent upper timing edge to the exhaust porting that may be moved upwardly or downwardly depending on engine speed. In this way, power can be realized across a broader range of engine speeds. As the timing for both the opening and closing of the exhaust porting is changed through movement of a valve mechanism, the timing can better employ a pressure wave in the exhaust passage.

The speed at which two-cycle engines operate and the harsh environment of the exhaust of such engines have resulted in substantial design problems in devising such exhaust timing control devices. The devices must respond quickly to changes in engines speed, they must be capable of withstanding a wide temperature range from cold engine starts to continuous high power operating conditions and they must continue to operate in an environment having a tendency to accumulate deposits of carbon in areas not subjected to direct high temperature exhaust flow.

The foregoing environment requires mechanisms which will not quickly erode under the impingement of high temperature exhaust flow and yet be sufficiently light to respond quickly to changing engine speeds. The harsh environment also requires high heat transfer at thin walled sections, avoidance of direct impingement on such sections and the avoidance where possible of thin walled sections themselves. In addition, the harsh environment encountered by such timing control devices is enhanced by sealing mechanisms which prevent exhaust flow from depositing carbon in areas where the relative movement of parts would be inhibited by carbon build-up.

One prior device employed for exhaust timing control is disclosed in Japanese Utility Model Publication No. 36047/1972. In this device, the thin components exposed to high temperature exhaust gas can be adversely affected. A problem with increasing the size, and correspondingly the weight, of such components to overcome the thermal loads is that the devices become too heavy to respond properly to rapid changes in engine speed without correspondingly larger components employed for driving the valve. This can in turn reduce the effectiveness of the exhaust passage as well.

In systems where more substantial components may be arranged to avoid such problems with heat, by being located in recesses of the exhaust passage for example, problems can then develop in the creation of thin wall sections in the cylinder, principally around the exhaust port where such recesses approach the cylinder wall. Where thin walled areas exist, heat is less able to be conducted away to cooling devices on the engine. Such systems employing recesses and the like also can have areas where carbon build-up is detrimental to the operation of the system. However, sealing of such areas is difficult because of the high temperature environment and because of the need for clearances to accommodate thermal expansion and contraction of the components. Thus, substantial design considerations are required in the construction of such exhaust timing control devices.

SUMMARY OF THE INVENTION

The present invention is directed to apparatus for defining a variable, apparent upper timing edge on the exhaust ports of two cycled engines. The apparatus contemplates light weight construction, the minimizing of areas of high thermal stress and the inhibition of carbon build-up in critical areas.

In a first aspect of the present invention, a valve body is contemplated which employs a plate having a substantial portion of reduced thickness in addition to an upwardly extending portion adjacent the control surface. This structure accommodates thermal stress and is light weight to reduce inertial loads.

In a further aspect of the present invention, a valve body is configured such that the edge portions of the exhaust port in the cylinder block may experience sufficient heat transfer capability through increased wall thickness to accommodate the high temperature exhaust flow thereby. To this end, the valve body may be tapered to provide clearance for additional wall thickness of the cylinder block at the exhaust ports. The valve body may also be configured to aid in sealing the components, particularly approaching the corners of the exhaust porting by means of a downwardly curving valve body.

In another aspect of the present invention, sealing between the exhaust passage and the valve body located therein for accomplishing the exhaust timing control are arranged with overlapping sections to create simple labyrinth seals to avoid the injurious flow of exhaust gases to areas between the valve body and the most adjacent wall portions of the cylinder block.

Accordingly, it is an object of the present invention to provide an improved exhaust timing control apparatus for two-cycle engines. Other and further objects and advantages will appear hereinafter.

DETAILED DESCRIPTION OF THE PREFERRED EMBODIMENT

Figure 3:
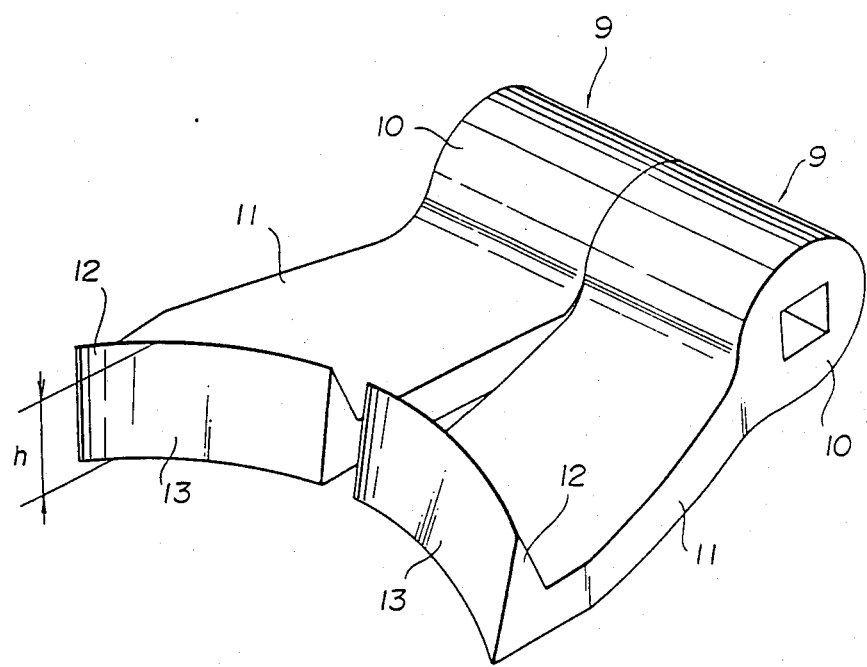
FIG. 3 is an oblique view of a valve mechanism of the present invention.
Figure 4:
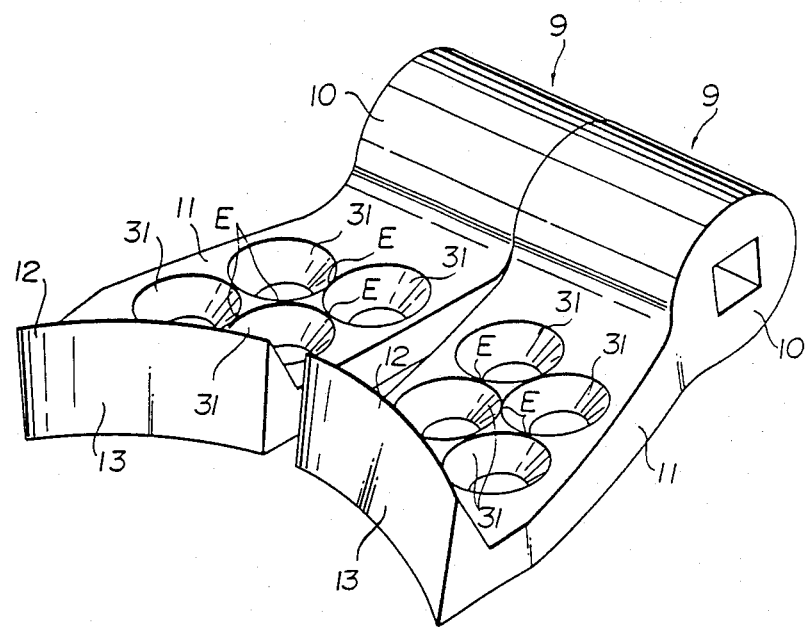
FIG. 4 is an oblique view of a second embodiment of a valve mechanism of the present invention.

Turning in detail to the drawings, FIGS. 1 through 4 illustrate a first arrangement with FIG. 4 showing one modification to the valve mechanism. A cylinder block 1 of a two-cycle internal combustion engine is illustrated having a cylinder head 2, a piston 3 slidably fitted into the cylinder of the cylinder block 1 and scavanging paths and ports 4. Also arranged in the cylinder block is an exhaust passage 5 and exhaust port 5a. In the central portion of the exhaust passage 5 extending vertically is a web or reinforcing rib 6. This rib extends to the cylinder at the exhaust port 5a, dividing the port into two openings. The rib 6 acts to strengthen the area of the cylinder block around the exhaust passage and also acts to prevent the piston rings 34 from extending outwardly in a radial direction such that the rings interfere with the upper 15b and lower 15c edges of the exhaust port 5a.

A recess 7 is formed in an upper portion of the exhaust passage 5 arranged adjacent the port 5a. In the recess 7, a shaft 8 is rotably arranged in a plane perpendicular to the centerline of the cylinder. The shaft 8 has a rectangular cross section at the portion thereof traversing the exhaust passage to receive the valve body 9 divided, in this embodiment, into two elements mutually symmetrical and disposed to either side of the rib 6.

The valve elements defining the valve body 9 may be best seen in FIG. 3. The shaft 8 extends through a shaft bearing portion 10. A planar portion or plate 11 extends from the shaft bearing portion 10 toward the sidewall of the cylinder. At one end of the plate 11 is located an upwardly extending ridge 12. In this embodiment, a first, distal side of the upwardly extending ridge 12 is defined as a control surface 13 having a height h. The second or proximal side of the ridge 12 extends downwardly and away from the cylinder to meet with the plate portion 11. The control surface 13 is arranged to approximate a section of the cylinder wall in the area of the exhaust port. The recess 7 in the upper surface of the exhaust passage is arranged to follow the contour of the upper surface of the valve body 9. In cross section, the recess constitutes a triangular section 7a to accommodate the upwardly extending ridge 12. A flat portion 7b accommodates the plate portion 11 of the valve body 9 while another recessed portion 7c is arcuate in cross section to receive the shaft bearing portion 10 of the valve body 9.

The valve body elements are operated to be actuated in a pivotal manner by a driving mechanism 20 through the shaft 8. The driving mechanism 20 includes a wire guide 21 attached to the shaft 8 which projects outwardly of the cylinder block 1. A motor (not shown) is connected to the wire guide 21 through a wire 22 which is controlled by a controller (not shown) for reversibly operating the motor in accordance with the rotational speed of the engine.

The portion of the shaft 8 which projects from the cylinder 1 and the wire guide 21 are arranged within a casing 23 attached to the cylinder block 1. A casing cover 24 is affixed to the outer side of the wire casing 23 to define a chamber for receipt of the driving mechanism 20. A bushing 25, a retainer 26 and a seal member 27 are arranged to pivotally support and seal the shaft 8. Ring grooves 8a are formed in the shaft 8 outside of the square portion receiving the elements of the valve body 9.

When the engine is rotated at low speed, the shaft 8 is rotated in the predetermined direction so as to cause the valve body 9 to swing downwardly to project into the exhaust passage 5. The control surface 13 then extends into the upper portion of the valve port 5a as can be seen in solid line in FIG. 1. The upper edge of the port 5a is lowered in effect by this rotation of the valve body by a distance L. As a result, the exhaust port 5a which is opened and closed by the reciprocation of the piston is opened later and closed earlier by the amount L by which the control surface 13 is lowered as described above.

In this condition, when the engine rotates at low speed, the exhaust port 5a is controlled such that the reflected pressure wave in the exhaust passage returns to the exhaust port 5a immediately before the exhaust port is closed and after the scavanging ports are closed or closing. This results in more efficient charging of the combustion chamber at the low speed.

Figure 1:
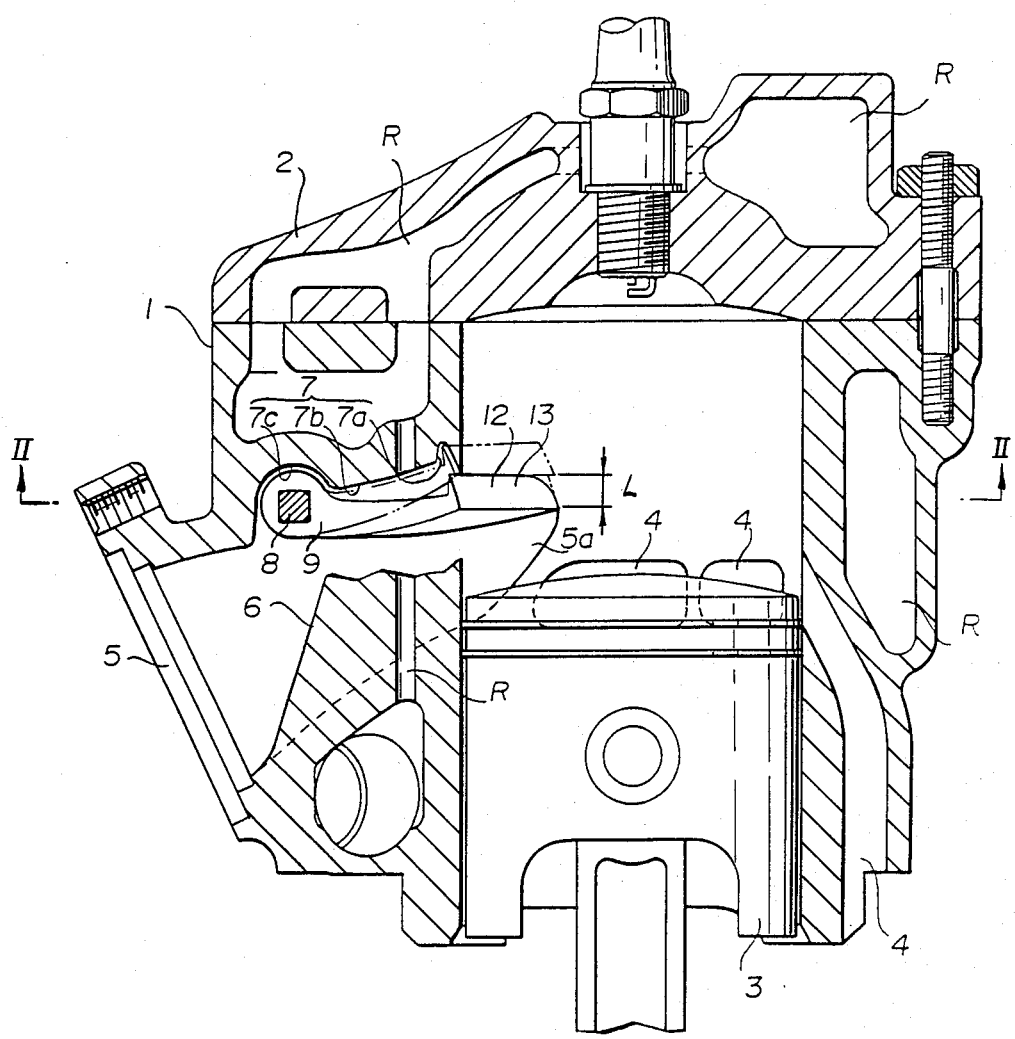
FIG. 1 is a cross-sectional elevation of a two-cycle engine employing the present invention.
Figure 2:
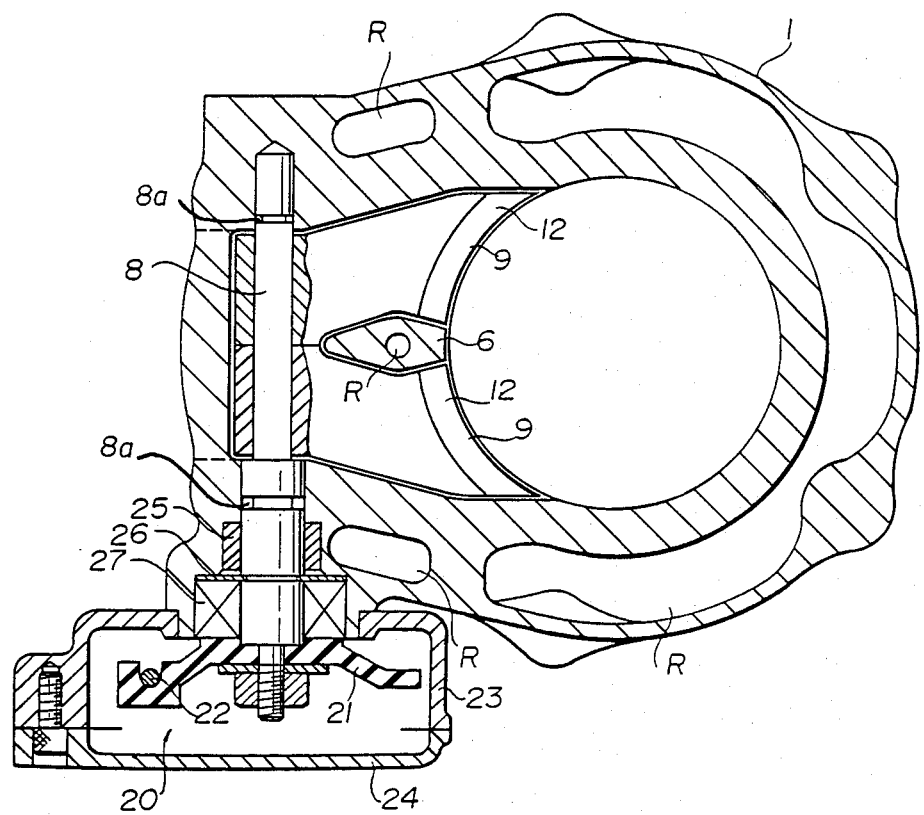
FIG. 2 is a cross-sectional plan view taken along line II—II of FIG. 1.

When the engine has reached a high speed region, the valve body 9 is caused to swing in the opposite direction so as to be withdrawn into the recess 7 as shown by the phantom lines in FIG. 1. Under this condition, the exhaust port 5a is opened early and closed later. This allows the reflected pressure wave to return to the exhaust port 5a immediately before the exhaust port is closed, again improving charging efficiency of the cylinder. Consequently, the exhaust port is better timed to accommodate a wider range of engine speeds. The control on the valve body 9 by the mechanism 20 may be accomplished by a continuously variable control system or a step system having two or more steps responsive to engine speed.

With the recess 7, the entire valve body may be withdrawn from the principal exhaust passage. This is advantageous as the maximum heat of exhaust gases is generally encountered at higher engine speeds. The upwardly extending ridge portion 12 defines a control surface 13 which allows substantial valve displacement into the passageway of the exhaust passage. Thus, a substantial degree of control can be achieved on the exhaust timing. At the same time, the plate portion 11 has a thinner wall. At low speeds when the valve body extends into the exhaust passage, temperatures are lower; and when temperatures are higher, at higher operating speeds, the valve body is retracted such that the thin wall plate portion 11 is protected from excessive thermal stress. The reduced thickness of the plate portion 11 helps to reduce the weight of the overall valve body, requiring less force to rapidly change position thereof. The increased size of the shaft bearing portion 10 is located where angular inertia is minimized. Consequently, this increased size does not significantly contribute to increased loading on the actuation mechanisms. In addition, it provides a stronger mounting mechanism for the valve body 9.

Looking specifically to FIG. 4, another embodiment of the valve mechanism is illustrated. In this embodiment, a plurality of holes 31 are formed in the planer portion 11 of the valve body 9. This arrangement allows flow from the recess portion of the mechanism. As the valve body 9 actuates, the edge portions E act to dislodge and break-up carbon deposits. These deposits may then pass through the holes 31 into the exhaust passage and then harmlessly from the engine. Thus this discharge of the carbon avoids the build-up thereof in the recess 7 such that the valve body 9 can continue to be closed up into the recess portion.

Figure 5:
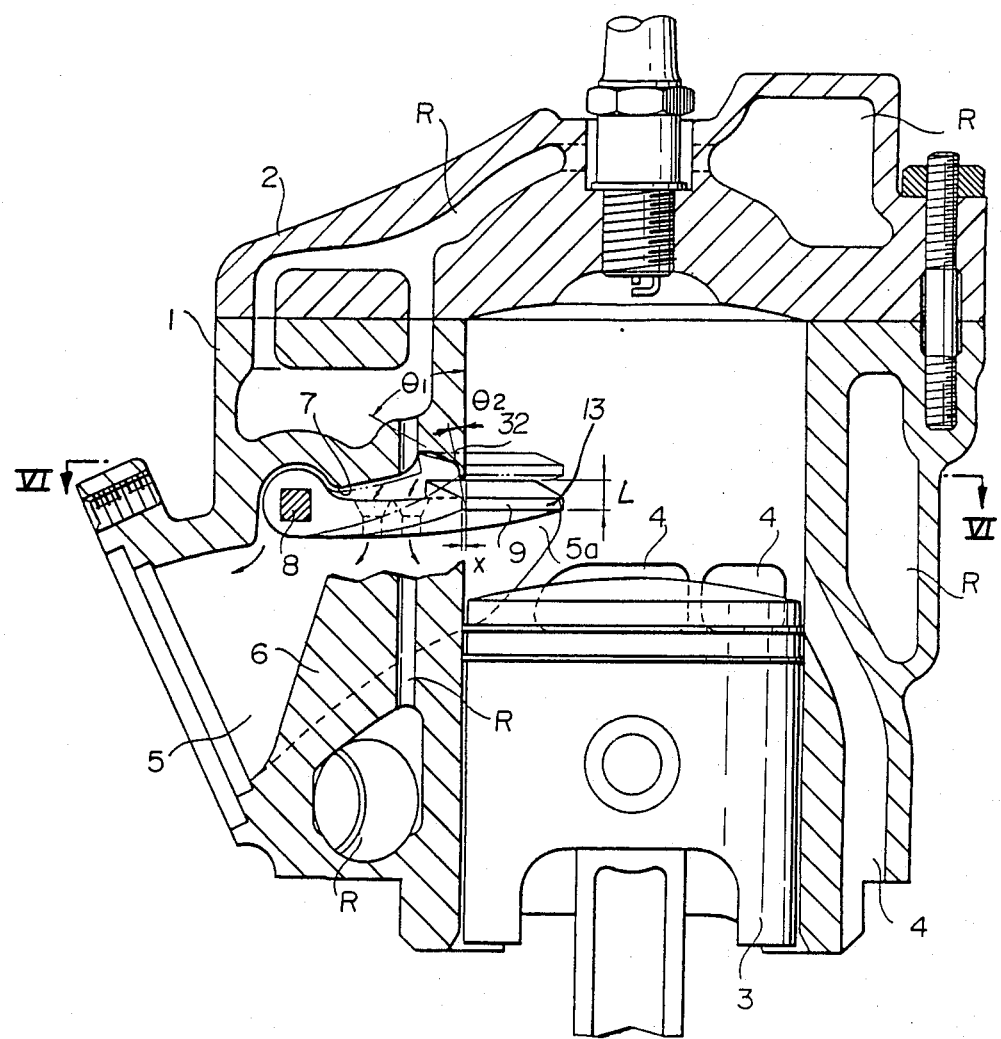
FIG. 5 is a cross-sectional elevation of a two-cycle engine employing another embodiment of the present invention.
Figure 6:
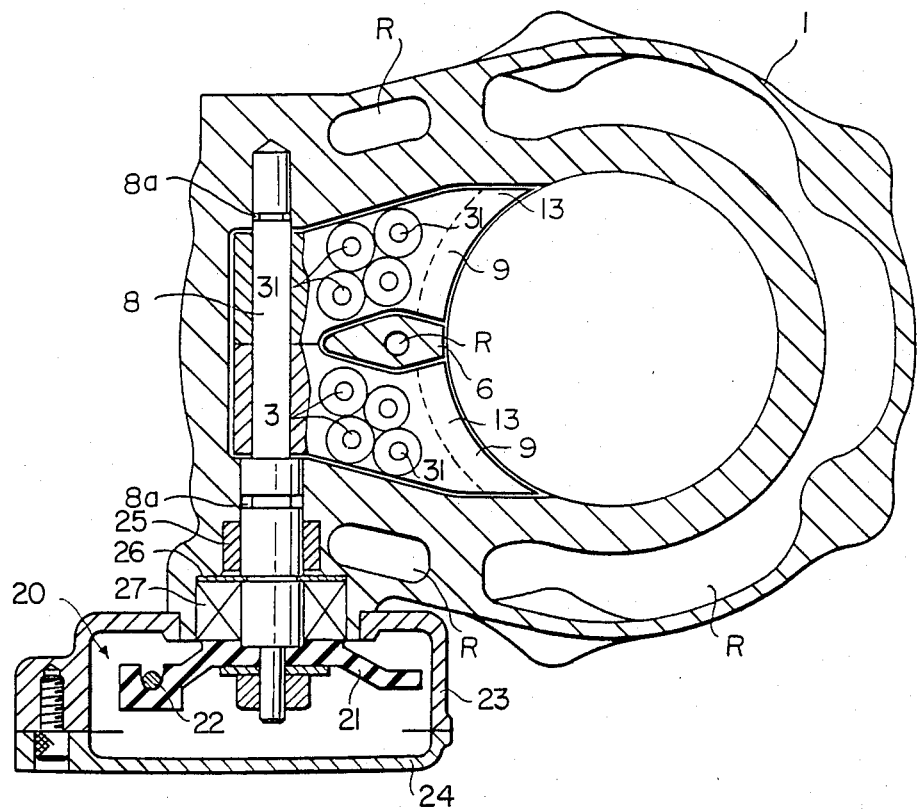
FIG. 6 is a cross-sectional plan view of the device of FIG. 5 taken along line VI—VI of FIG. 5.
Figure 7:
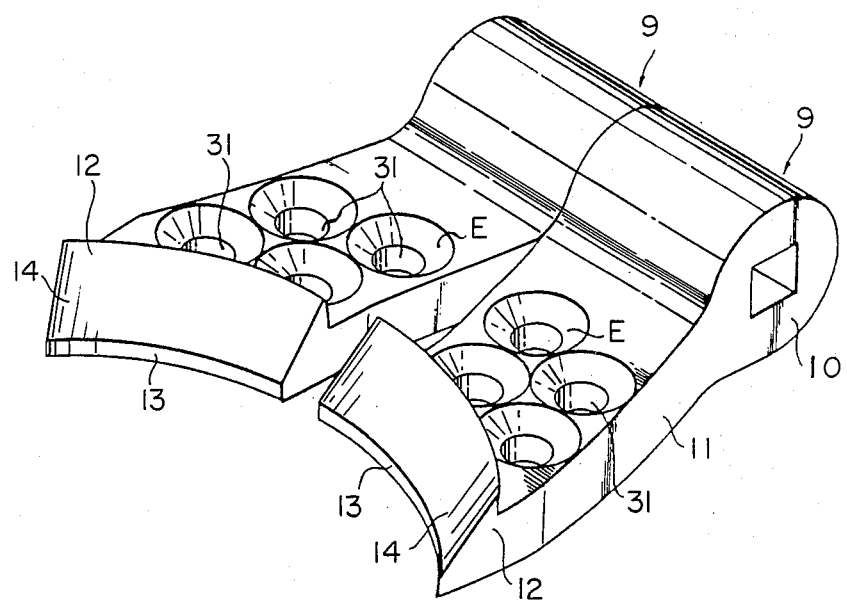
FIG. 7 is an oblique view of yet another valve mechanism of the present invention.
Figure 8:
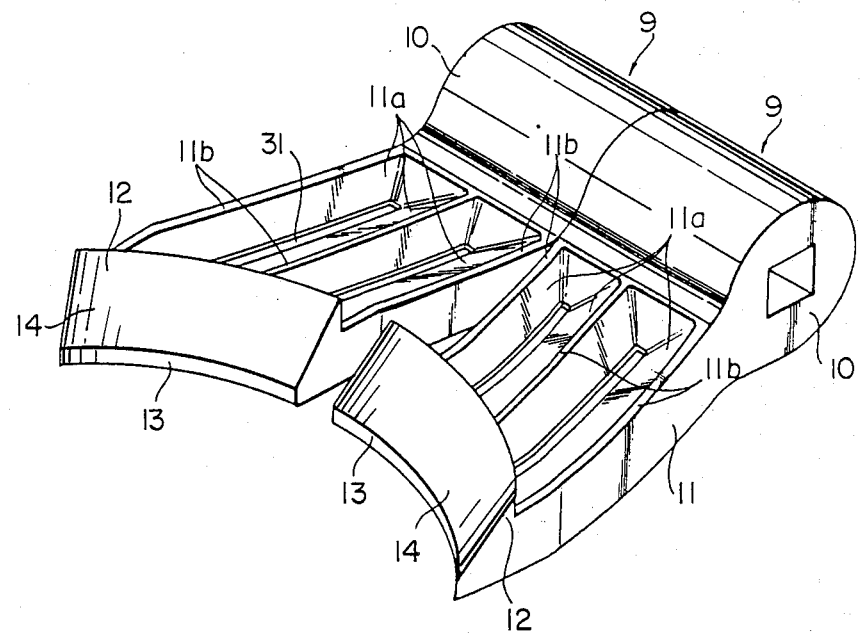
FIG. 8 is an oblique view of another embodiment of a valve mechanism of the present invention.
Figure 9:
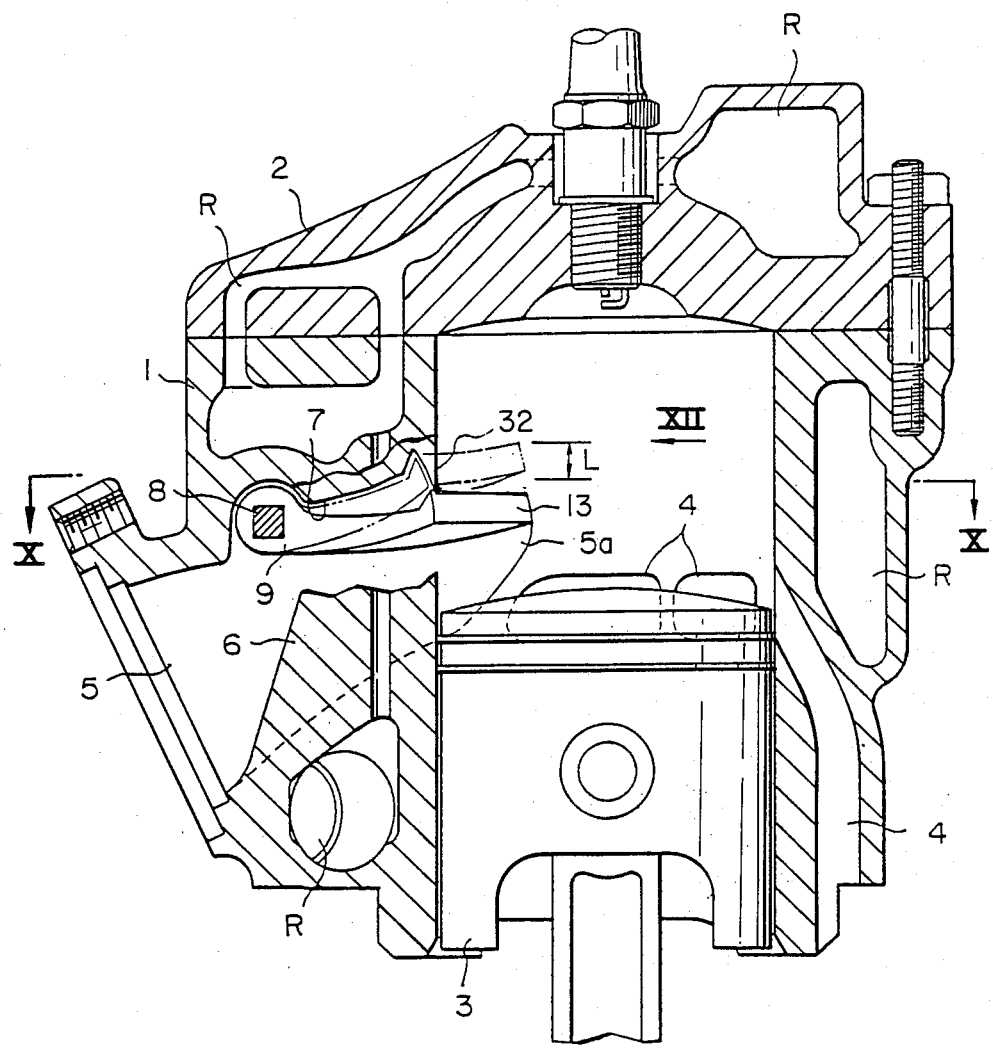
FIG. 9 is a cross-sectional elevation of a two-cycle engine employing another embodiment of the present invention.
Figure 10:
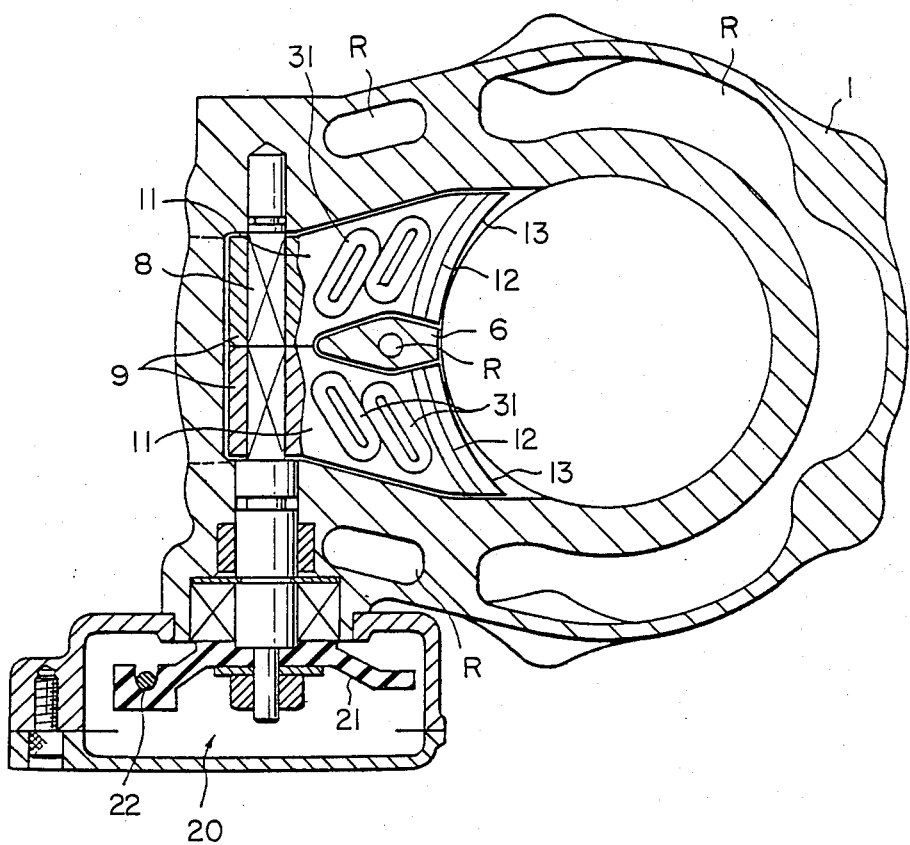
FIG. 10 is a cross-sectional plan view taken along line X—X of FIG. 9.
Figure 11:
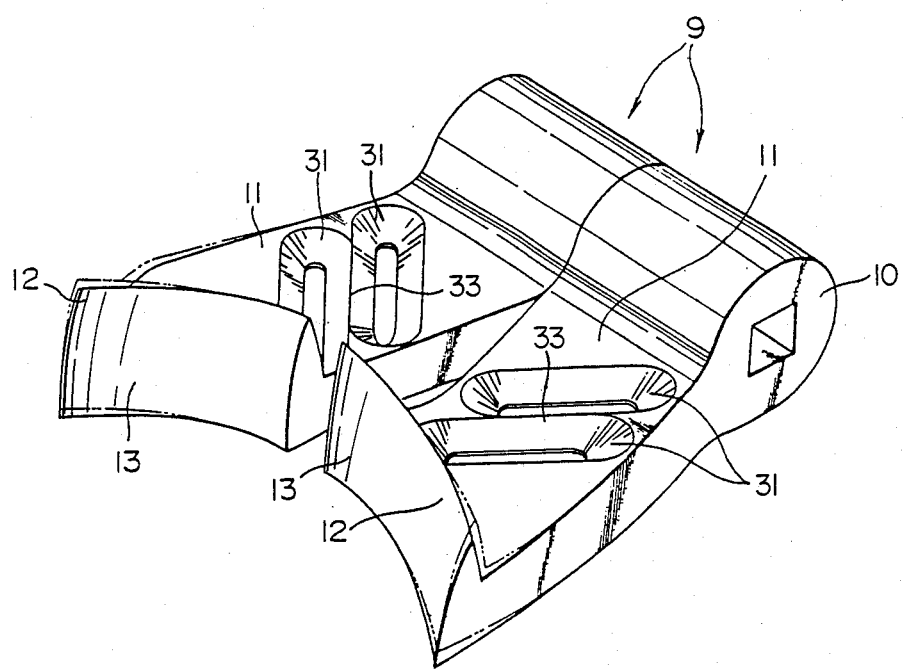
FIG. 11 is an oblique view of another valve mechanism of the present invention.

Referring next to the embodiment of FIGS. 5, 6 and 7 and the variation on the valve mechanism of FIG. 8, it should be noted that reference numbers on the figures on all of the embodiments correspond to identical or equivalent elements. Repetitive description of such elements is avoided. Attention is directed in this embodiment to the arrangement of the forward end of the valve body 9 in association with the exhaust port 5a and the sidewall of the cylinder. The controlling surface 13 of the valve body 9 is generally arranged such that it approximates a segment of the inner wall of the cylinder at the exhaust port area. The controlling surface 13 is displaced from that sidewall by a gap x as seen in FIG. 5. The upper surface of the valve body 9 and the surface of the recess 7 are arranged such that the recess conforms to the surface of the valve body with the valve body retracted into the recess. Thus, the shape of the upper portion of the valve body 9 impacts on the corresponding shape of the recess 7. This is of particular interest at the portion immediately adjacent to the sidewall of the cylinder at the exhaust port 5a.

An upper edge is defined between the sidewall of the cylinder and the inner wall of the recess as it extends upwardly from the intake port 5a. This wall forms a relatively thin edge which, can be susceptible to damage from high temperature exhaust loads. This edge portion 32 defines an included angle $\theta_1$. This angle $\theta_1$ is arranged in the embodiment of FIG. 5 to be greater than the angle $\theta_2$. The angle $\theta_2$ is defined as the line between the sidewall surface of the cylinder and the continuation of the arc of movement of the upper edge of control surface 13 as it would be projected upwardly from the margin of the edge portion 32. This increased thickness accommodates more rapid heat transfer from the vulnerable edge forming the upper edge of the exhaust port 5a. This allows heat to be transferred through the water passages R from the engine.

Corresponding to this contour of the recess 7, the elements of the valve body 9 accommodates the widened edge 32. To this end, the upwardly extending ridge 12 includes a chamfered ridge surface 14 which is arranged contiguous with the controlling surface 13 and extends upwardly to the top of the ridge. The second surface then extends downwardly to the plate portion 11 of the valve body 9. The ridge surface 14 continues to cooperate with the controlling surface 13 to provide a full range of movement L while continuing to define an apparent upper surface of the valve porting 5a across the full distance L. It has been found that the fit between the valve body 9 and the sidewall of the cylinder at the exhaust port 5a can be compromised to some extent with the chamfered ridge surface 14 without reducing the ability of the overall mechanism to provide an adjustable apparent upper port edge on the exhaust port 5a. With the holes 31 and associated edge portions E, the flow coming through the gap between the edge 32 and the ridge surface 14 is accommodated and may act to draw carbon deposits through the holes 31 and harmlessly into the exhaust passage.

A substantial variety of designs may be employed for the plate portion 11. FIGS. 7 and 8 illustrate two such possible configurations. In FIG. 7, the holes 31 are shown to be circular in cross section with tapered edge portions E for accommodating and breaking-up carbon deposits. In FIG. 8, rectangular holes 31 are employed with tapered edge portions 11a and ridges 11b. Again, accommodation of some flow and entrained carbon is achieved as is the action of dislodging or breaking-up carbon through actuation of the valve body 9.

Looking next to the embodiment of FIGS. 9 through 12, attention is directed again to the area adjacent the exhaust port 5a. A naturally occurring relationship between the exhaust port 5a and the control surface 13 of the pivotally mounted valve body 9 when associated with a cylinder of circular cross section is that the effective angular movement of the valve body 9 is magnified by the distance from the pivoted axis of the valve body to the control surface 13. As can best be seen in FIG. 10, the outer ends of the control surface 13 are displaced from the pivot axis of the valve body 9 a greater distance than the center portion thereof. As the valve body 9 is pivoted upwardly into the recess 7, the end portions at the control surface 13 move a greater distance than the center portion.

The foregoing natural relationship between such components can be troublesome. A larger recess capacity may be required at the outer edges thereof to accommodate the increased swing. This can adversely affect the edge portion 32 in narrowing that portion with adverse consequences to heat transfer away from the exposed edge. The ends are also more quickly retracted upwardly which changes the relative timing on the exhaust port between the center position of the control surface 13 and the extremities thereof.

Figure 12:
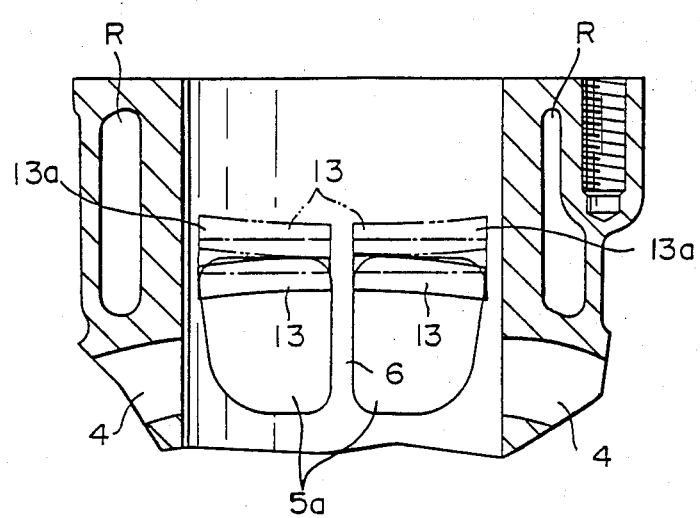
FIG. 12 is a detailed view taken in the direction of arrow XII of FIG. 9.

To accommodate the foregoing, the control surface 13 is shown in this embodiment to be curved so that the opposite ends thereof are curved downwardly from the center portion thereof. Preferably, the curvature of the distal end of the valve body 9 is such that the lower edge of the control surface 13 is roughly horizontal relative to the axis of the cylinder when the valve body 9 is at a middle position between its closed and opened position, as shown in FIG. 12. This arrangement balances the ascent of the opposite ends of the control surface 13 with the descent thereof at the extreme positions.

With the valve body curved as described, the control surface 13 at its outer edges is lowered as compared with the center thereof. Thus, the outer ends do not extend as fully into the recess as with an uncurved valve body. Accordingly, the length of the projection 32 at the outer ends of the port 5a may be reduced in height. This reduces the length of the thermal path from the edge of the exhaust port 5a to an appropriate thermal sink. In addition, the edge portion 32 is structurally stronger.

As noted in prior embodiments, yet another arrangement for the hole 31 is illustrated. In this instance, a sharp edge line 33 is shown between the holes as a means for dislodging carbon deposits between the surface of the recess 7 and the top surface of the plate portion 11 of the valve body 9.

Figure 13:
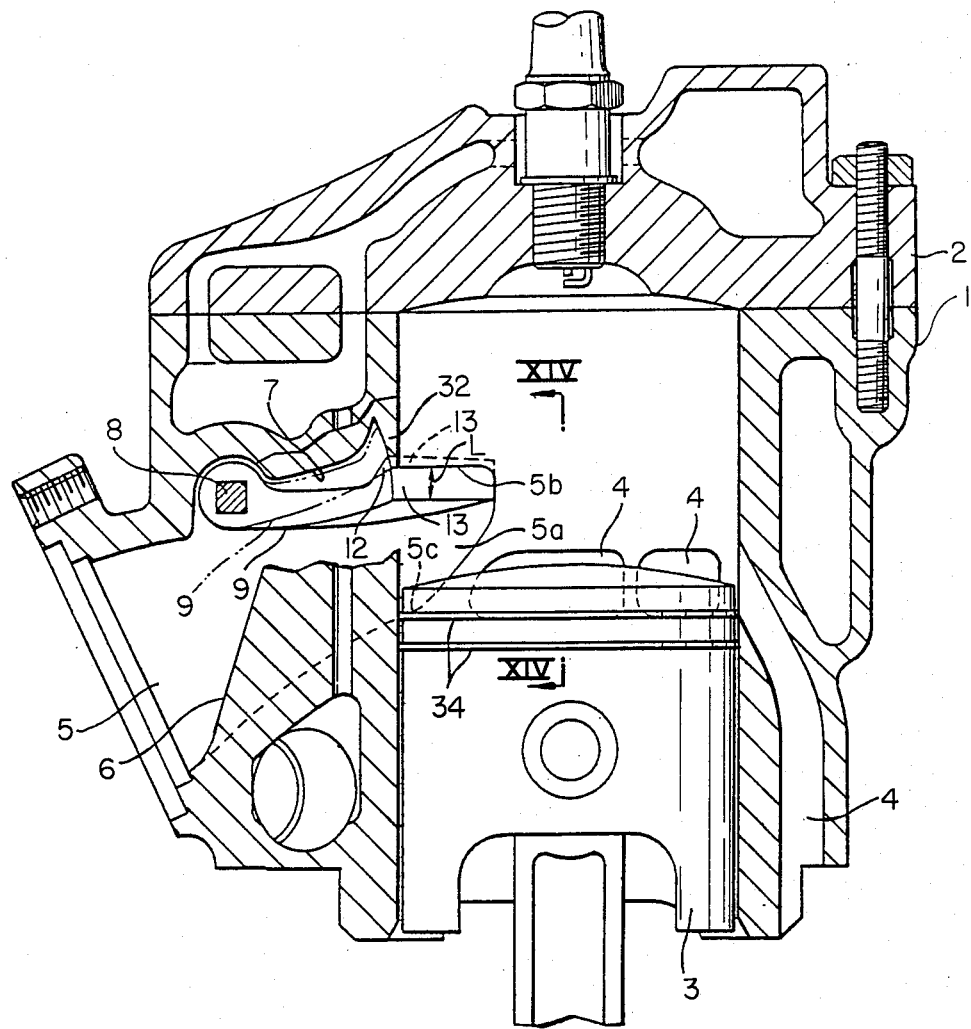
FIG. 13 is a cross-sectional elevation of yet another embodiment of the present invention.
Figure 14:
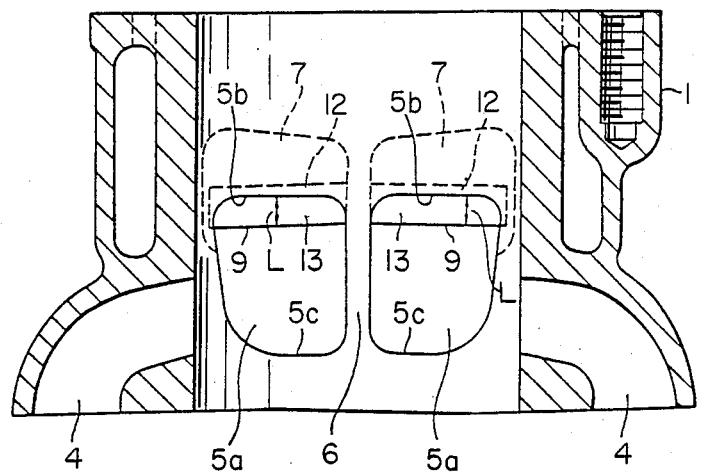
FIG. 14 is a detailed view of the device of FIG. 13 taken along line XIV—XIV of FIG. 13.

Looking next to the embodiment of FIGS. 13 and 14, attention is again directed to the cooperation between the exhaust port 5a and the distal end of the valve body 9 at the control surface 13. In FIG. 13, the full extent of travel of the valve body 9 is illustrated with the extended position illustrated in full and the fully retracted position illustrated in phantom. The arrangement thus contemplates a range in timing height of L. With the valve body 9 fully extended, it can be seen that there remains an overlap between the downwardly depending edge 32 of the cylinder wall and the upwardly extending ridge 12. This overlap of the valve body 9 and the depending wall 32 of the cylinder is arranged such that the overlap exists in a projection of a plane perpendicular to the axis of the cylinder which is substantially the direction of the exhaust flow from the engine. The passage between these components thus creates a labyrinth seal acting to reduce the flow of gases into the recess 7. As a natural consequence to flow being reduced, less heat is transferred into this area, less carbon forming material may also be introduced and the effectiveness of the apparent valve timing is not reduced.

Figure 15:
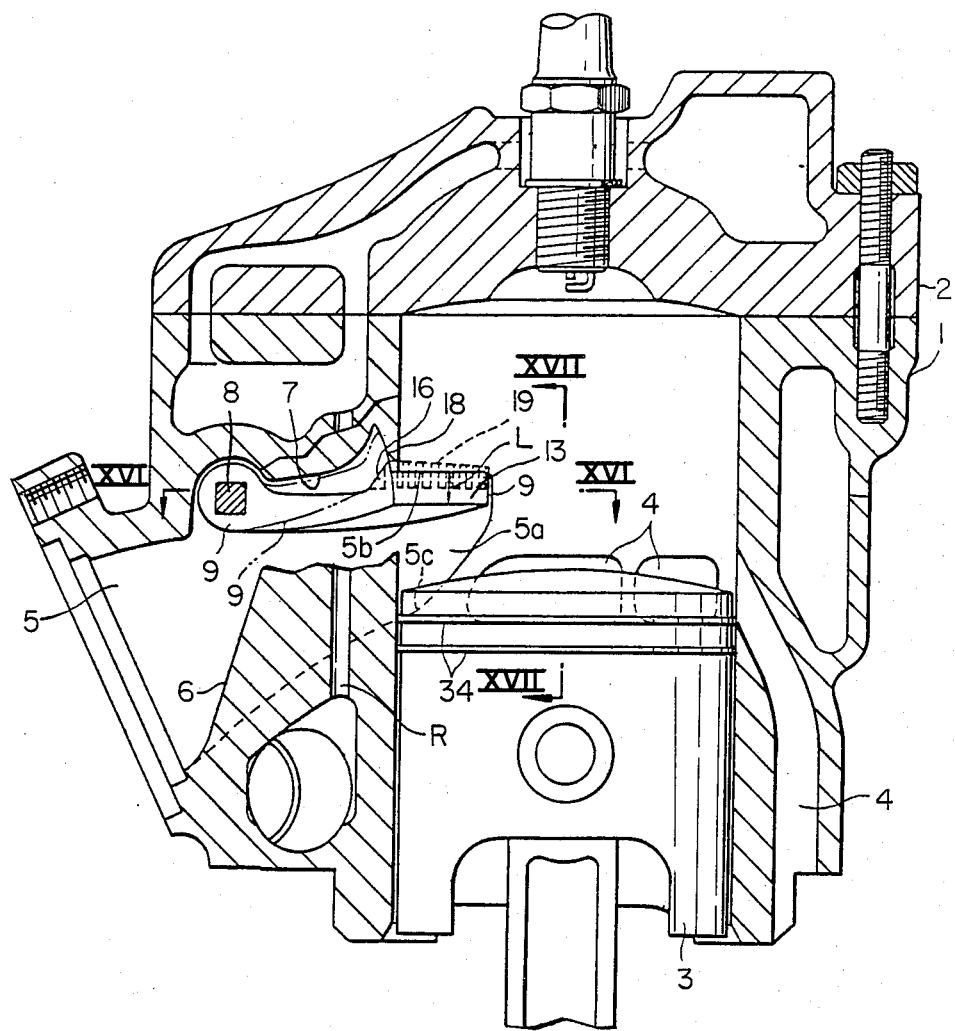
FIG. 15 is a cross-sectional elevation of a two cycled engine employing another embodiment of the present invention.
Figure 16:
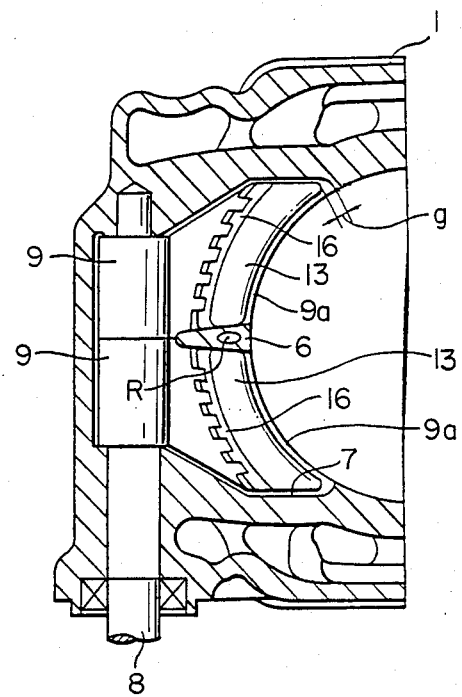
FIG. 16 is detailed cross-sectional view taken along line XVI—XVI of FIG. 15.
Figure 17:
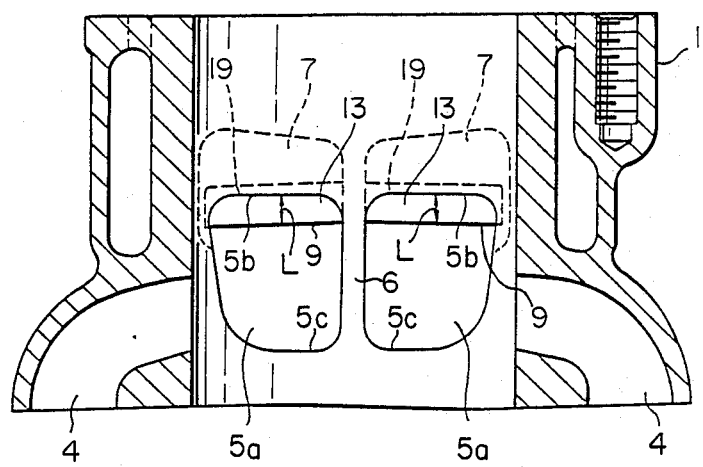
FIG. 17 is a cross-sectional view taken along line XVII—XVII of FIG. 15.

Turning then specifically to the embodiment of FIGS. 15, 16 and 17, a further feature is illustrated in the association between the exhaust port 5a and the valve body 9. Side recesses are defined within the recess 7 to accommodate a valve body 9 which is wider than the width of the exhaust port 5a. This relationship is possibly best illustrated in FIGS. 16 at the gap g. With the substantial swinging of the end portions of the valve body, the gap g in systems not incorporating side recesses is enlarged. This can result in the flow of exhaust gases resulting in delayed exhaust timing. With the side recesses and inwardly extending exhaust port margins, the gap g may be reduced, lessening the effect of the margins on timing. As shown in this embodiment, the ridge 12 is also shown to overlap at 19 across the top of the exhaust port 5a as well. The end surface of the ridge 12 facing the inside of the cylinder are serrated to form the controlling surface 13. This defines a fine gap between the valve body and the inner surface of the cylinder in the recess 7 when the valve body 9 is swung to the closed position. The overlap 19 providing the labyrinth seal may be selected so that it is approximately 1.5 mm at the narrowest portion thereof. The selection of an appropriate overlap is dependent on the desired height of the depending edge 32 which in turn tends to influence heat flow from the edge of the exhaust port 5a. By employing the overlap 19 and by structuring the outer recesses so as to reduce the gap g, significant leakage uncontrolled by the lower timing edge of the controlling surface 13 is reduced.

Thus, improved exhaust timing control devices have been disclosed. These devices act to minimize weight, reduce the effect of heat and provide sealing for the reduction in carbon deposits. A more effective exhaust timing control apparatus may, therefore, be realized. While embodiments in applications of this invention have been shown and described, it would be apparent to those skilled in the art that many more modifications are possible without departing from the inventive concepts here. The invention, therefore, it is not to be restricted except in the spirit of the appended claims.

What is claimed is:

1. An exhaust timing control apparatus for a two-cycle engine cylinder having an exhaust port and passage extending from a sidewall of the cylinder, comprising a valve body pivotally mounted about a pivot axis in the exhaust passage and extending to a control surface at the exhaust port to define an apparent upper timing edge of the exhaust port, said valve body having a shaft bearing portion about said pivot axis, a plate effectively forming at least a portion of an upper surface of said passage extending toward the exhaust port from said shaft bearing portion and a ridge upwardly extending from said plate at one end thereof adjacent said control surface.

2. The exhaust timing control apparatus of claim 1 wherein said shaft bearing portion extends upwardly from said plate.

3. The exhaust timing control apparatus of claim 1 further comprising a recess in an upper surface of the exhaust passage to receive said valve body, said recess following a contour of an upper surface of said valve body in said recess.

4. The exhaust timing control apparatus of claim 1 further comprising a recess in an upper surface of the exhaust passage to receive said valve body, said recess extending upwardly adjacent the exhaust port to receive said upwardly extending ridge.

5. The exhaust timing control apparatus of claim 4 wherein the inner surface of said recess and the sidewall of the cylinder define an edge portion in the cylinder wall, said edge portion having an included angle which is greater than an angle formed between the sidewall of the cylinder and a continuation of the arc of movement of the upper edge of said control surface upwardly from said edge portion.

6. The exhaust timing control apparatus of claim 1 further comprising a recess in an upper surface of the exhaust passage to receive said valve body, said upwardly extending ridge having a first surface contiguous with said control surface along a first edge thereof, said first surface extending upwardly and away from the cylinder sidewall at an angle to the control surface from said first edge, said recess conforming to said control surface and said first surface with said valve body positioned in said recess.

7. The exhaust timing control apparatus of claim 6 wherein said upwardly extending ridge includes a second surface extending downwardly and away from said first surface to said plate, said recess conforming to said second surface with said valve body positioned in said recess.

8. The exhaust timing control apparatus of claim 1 wherein said control surface approximates a segment of the cylinder sidewall at the exhaust port, said control surface having a center, ends, and a lower edge, the lower edge of said control surface being axially lower at the ends of the lower edge of said control surface than at the center of the lower edge of said control surface.

9. The exhaust timing control apparatus of claim 1 further comprising a recess in an upper surface of the exhaust passage to receive said valve body, said recess extending upwardly and away from the sidewall of the cylinder at the exhaust port defining an edge portion along an upper boundary of the exhaust port, said upwardly extending ridge on said valve body overlapping with said edge portion as seen in a plane extending perpendicular to the axis of the cylinder throughout the whole travel of said valve body.

10. The exhaust timing control apparatus of claim 1 further comprising a recess in an upper surface of the exhaust passage to receive said valve body and sidewall recesses in first and second sides of the exhaust passage adjacent to the valve body, said valve body extending ito said side recesses such that said valve body is wider than the exhaust port.

11. An exhaust timing control apparatus for a two-cycle engine, with a cylinder having a sidewall, an exhaust port, and a passage extending from the sidewall, comprising
 a valve body pivotally mounted about a pivot axis in the exhaust passage, and
 a control surface at the exhaust port, wherein said valve body extends to said control surface to define an apparent upper timing edge of the exhaust port, said valve body comprising a shaft bearing portion about said pivot axis, a plate extending toward the exhaust port from said shaft bearing portion, the width of said plate in the direction of said pivot axis exceeding the depth of said plate in a direction normal to said pivot axis and said direction of extension, and a ridge extending upwardly from said plate at one end thereof adjacent to said control surface.

12. The exhaust timing control apparatus of claim 11, wherein said plate is approximately planar in shape.

13. The exhaust timing control apparatus of claim 11, further comprising a recess in an upper surface of the exhaust passage to receive said valve body, said recess following a contour of an upper surface of said valve body in said recess.

14. The exhaust timing control apparatus of claim 13, wherein said valve body and said recess form a labyrinth seal to inhibit the flow of gases into said recess when said valve body is retracted into said recess.

* * * * *